US008078471B2

(12) United States Patent
Geisel et al.

(10) Patent No.: US 8,078,471 B2
(45) Date of Patent: Dec. 13, 2011

(54) APPARATUS FOR THE PROCESSING OF SALES AND FOR OUTPUTTING INFORMATION BASED ON DETECTED KEYWORDS

(75) Inventors: Alfred Geisel, Wehingen (DE); Martin Leu, Balingen (DE)

(73) Assignee: Bizerba GmbH & Co. KG, Balingen (DE)

( * ) Notice: Subject to any disclaimer, the term of this patent is extended or adjusted under 35 U.S.C. 154(b) by 846 days.

(21) Appl. No.: 12/148,362

(22) Filed: Apr. 17, 2008

(65) Prior Publication Data
US 2008/0294438 A1 Nov. 27, 2008

(30) Foreign Application Priority Data
Apr. 18, 2007 (DE) .................. 10 2007 018 327

(51) Int. Cl.
*G10L 15/22* (2006.01)
*G10L 15/00* (2006.01)
(52) U.S. Cl. .................. 704/275; 704/251; 704/270
(58) Field of Classification Search .................. None
See application file for complete search history.

(56) References Cited

U.S. PATENT DOCUMENTS

| 4,605,080 | A | | 8/1986 | Lemelson |
| 5,839,104 | A | | 11/1998 | Miller et al. |
| 6,018,711 | A | * | 1/2000 | French-St. George et al. ............... 704/275 |
| 6,108,632 | A | * | 8/2000 | Reeder et al. ............... 704/275 |
| 6,199,044 | B1 | * | 3/2001 | Ackley et al. ............... 704/275 |
| 6,246,981 | B1 | * | 6/2001 | Papineni et al. ............... 704/235 |
| 6,910,003 | B1 | | 6/2005 | Arnold et al. |
| 6,982,388 | B2 | | 1/2006 | Kasinoff |
| 7,110,963 | B2 | * | 9/2006 | Negreiro ............... 705/15 |
| 7,398,209 | B2 | * | 7/2008 | Kennewick et al. ........... 704/255 |
| 7,672,845 | B2 | * | 3/2010 | Beranek et al. ............... 704/251 |
| 7,707,037 | B2 | * | 4/2010 | Claudatos et al. ............ 704/275 |
| 2002/0077830 | A1 | | 6/2002 | Suomela et al. |
| 2002/0143550 | A1 | * | 10/2002 | Nakatsuyama ............ 704/270.1 |
| 2003/0126013 | A1 | | 7/2003 | Shand |
| 2003/0132298 | A1 | | 7/2003 | Swartz et al. |
| 2007/0067203 | A1 | | 3/2007 | Gil et al. |

FOREIGN PATENT DOCUMENTS

| DE | 298 05 023 U1 | 3/1998 |
| DE | 100 37 314 A1 | 7/2000 |
| DE | 199 50 250 A1 | 4/2001 |
| DE | 100 37 314 A1 | 4/2002 |
| DE | 299 24 679 U1 | 10/2004 |
| JP | 09170945 A | 6/1997 |
| JP | 2001338345 A | 7/2001 |
| JP | 2002214028 A | 7/2002 |
| WO | WO 2005/043790 A2 | 5/2005 |

* cited by examiner

*Primary Examiner* — Talivaldis Ivars Smits
(74) *Attorney, Agent, or Firm* — Kilpatrick Townsend & Stockton LLP

(57) ABSTRACT

An apparatus for processing sales of articles, such as a store scale, has a microphone which listens to a conversation between a customer and a salesperson and converts words into an electrical speech signal, which signal is converted to a speech recognition result by a speech recognition device. A comparator compares the speech recognition result with keywords stored in a memory, with at least some of the stored keywords being product names which define a group of keywords. A control device, on the detection of a keyword belonging to the group and/or of a permitted combination of keywords which includes a keyword belonging to the group, outputs a piece of information associated with the detected keyword or combination of keywords and available via a data source, or outputs an offer for the output of the information, such as with a section menu, by an output device of the apparatus.

15 Claims, 2 Drawing Sheets

US 8,078,471 B2

APPARATUS FOR THE PROCESSING OF SALES AND FOR OUTPUTTING INFORMATION BASED ON DETECTED KEYWORDS

CROSS-REFERENCES TO RELATED APPLICATIONS

This application claims priority to German Application No. 102007018327.7, filed Apr. 18, 2007, the disclosure of which is herein incorporated by reference.

BACKGROUND OF THE INVENTION

The present invention relates to an apparatus for the processing of sales of articles of an assortment of goods to a customer, in particular to store scales.

Store scales are used, for example, at fresh product counters for sausage, meat, cheese or fish in retail stores or supermarkets to weigh an article requested by a customer. In a serving procedure, the customer advises the salesperson of the desired article and of the desired amount or of the desired weight. After the salesperson has counted out or portioned the article in accordance with the customer's request, the article is placed on the store scales and an identification number, also known as a PLU, associated with the article is input into the store scales. The weight and the price of the weighed article are then displayed to the customer.

The store scales are inactive up to the input of the PLU by the salesperson, i.e. during the longer part of the serving procedure. The customer is only provided with weight information and price information on the weighed article at the very end of the serving procedure.

SUMMARY OF THE INVENTION

It is an underlying object of the present invention to provide an apparatus of the initially named kind whose benefit for the customer goes beyond the output of weight information and price information at the end of a serving procedure.

This object is satisfied by an apparatus having a microphone device for listening to a conversation between a customer and a salesperson for the conversion of connected spoken words of the conversation into an electrical speech signal, having a speech recognition device for the generation of a speech recognition result representing the words from the electrical speech signal having a comparator for the comparison of the speech recognition result with keywords stored in a memory device of the apparatus for keyword recognition in the speech recognition result, with at least some of the stored keywords being product names which define a group of keywords, and having a control device which, on the detection of a keyword belonging to the group and/or of a permitted combination of keywords which includes a keyword belonging to the group, is adapted to output a piece of information associated with the detected keyword or with the detected permitted combination and available via a data source or to output an offer for the output of the information, in particular in the form of a section menu, by means of an output device of the apparatus.

The apparatus in accordance with the invention is an apparatus of the initially named kind, in particular store scales, which is further developed by speech recognition and speech control. Methods, software and apparatus for speech recognition are generally known from the prior art. The speech recognition is preferably independent of the speaker.

A microphone device is used as the input medium, in particular a conventional microphone which listens to the conversation between the customer and the salesperson and converts it into the electrical speech signal which is then processed by means of the speech recognition device to form the speech recognition result, usually a text. The different keywords are stored in the memory device, for example a hard disk and/or a flash memory of the apparatus. A "keyword spotting" can then be carried out by means of the comparator to detect keywords contained in the speech recognition result.

If the speech recognition result contains a product name, a piece of information associated with the product name which is available via the data source, for example an indication of origin, the composition of the product, ingredients which trigger allergies, recipes, information on supplementary products or advertising can be output by means of the control device.

The product name can be a name for a product group, for example "salami", or an article name which is associated with a PLU, for example "Milanese salami".

It is, however, also conceivable that the associated information is not output directly, but is first only offered for outputting. A selection menu can, for example, be output which allows the type of information to be output to be indicated.

Alternatively and/or additionally, the information or the offer to output the information can also or only be output when a combination of keywords is detected, with a keyword of the combination being a product name. Preferably, not all the combinations of keywords are permitted so that provision can be made, for example, that a combination of two product names does not result in any output.

The apparatus in accordance with the invention has the advantage that the associated information can already be output or provided for outputting at the start of the serving procedure, and indeed even before the salesperson inputs an identification number into the apparatus. The customer can consequently be supplied with product-related information, in particular advertising, during the waiting time up to the input of the identification number.

In accordance with an embodiment of the invention, the permitted combination includes a keyword of a further group of keywords whose keywords are not product names. The keywords of the further group can, for example, be amount indications or weight indications. The output of a piece of information associated with a product name can hereby be avoided in those cases in which the product name is spoken outside a sales procedure and/or purely randomly.

It is particularly preferred for the control device to be designed to output the information or the offer to output the information only when the keyword or the permitted combination is recognized within a preset time window. An unintentional output of information can hereby likewise be effectively avoided.

The control device is in particular configured to activate the preset time window on the recognition of a keyword belonging to a corresponding group of keywords or on the recognition of a permitted combination belonging to a corresponding group of permitted combinations of keywords. The combination "How can I help you?" could, for example, be used for the activation of the time window.

In accordance with another embodiment of the invention, the speech recognition device is configured to differentiate between statements of the customer and statements of the salesperson. This is in particular made possible in that the apparatus is taught the voices of the salesperson or salespersons. It can hereby be achieved, for example, that the activation of the preset time window is only possible by a salesperson.

In accordance with another embodiment of the invention, the speech recognition device is configured to recognize the age and/or gender of the customer. This makes it possible, for example, to automatically determine the buyer structure of a product.

The control device is preferably configured to select the information or the offer to output the information in dependence on the age and/or gender of the customer. It is hereby made possible to present information especially tailored to the respective customer.

It is generally possible for the output device to be a speech output device. The output device is, however, preferably designed as a visual presentation device, in particular a display. It is particularly preferred for the output device to be designed as a touch screen. This makes it possible for the customer to be able to choose between the kinds of information on offer by touching the visual presentation device.

In accordance with another embodiment of the invention, the data source is made as a hard disk, a flash component and/or a server. The server can be connected to the apparatus via a remote data transmission network.

A method is furthermore a subject matter of the present invention for the operation of an apparatus for the processing of sales of articles of a product assortment to a customer, in particular store scales, wherein a conversation between a customer and a salesperson is listened to and connected spoken words of the conversation are converted into an electrical speech signal, a speech recognition result representing the words is generated from the electrical speech signal, the speech recognition result is compared with stored keywords to recognize keywords in the speech recognition result, with at least some of the stored keywords being product names which define a group of keywords and, on detection of a keyword belonging to the group and/or of a permitted combination of keywords which includes a keyword belonging to the group, a piece of information associated with the detected keyword or with the detected permitted combination or an offer to output the information, in particular in the form of a selection menu, is output.

A further subject of the invention is a computer program with program code means to carry out the method in accordance with the invention when the program is carried out on a computer. A computer is here also understood as in particular every data processing device which in particular has a processor, a memory and interfaces for the input and/or output of data. The computer can in particular have a digital signal processor.

A subject of the present invention is furthermore a computer program product with program code means which are stored on a computer-readable data carrier to carry out the method in accordance with the invention when the computer program product is carried out on a computer. The data carrier can in particular be non-volatile stores in the form of corresponding semiconductor elements, CDs, DVDs or also floppy disks.

Non-restricting embodiments of the invention are shown in the drawing and will be described in the following.

DESCRIPTION OF THE PREFERRED EMBODIMENTS

Figure 1:
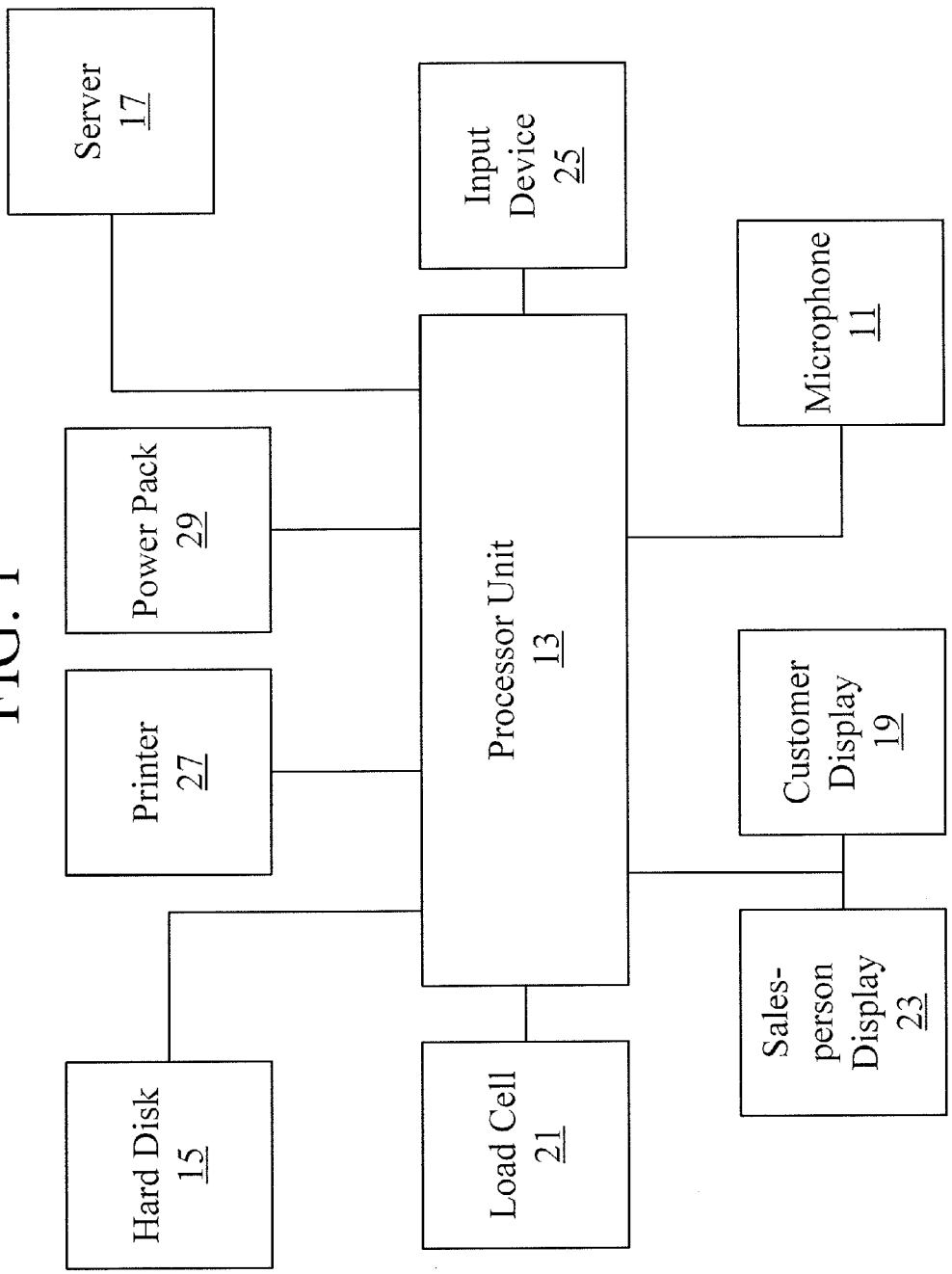
FIG. 1 is a block diagram of store scales in accordance with the invention.

The store scales shown in FIG. 1 first include a load cell 21 which determines the weight of an article disposed on it and forwards it to a processor unit 13 which is configured to display the weight of the article both on a display 19 for the customer and on a display 23 for the salesperson. Furthermore, an input device or keyboard 25 connected to the processor unit 13 is provided via which an identification number associated with the article (PLU) can be input into the store scales so that a price for the article can be calculated via the weight which is then likewise displayed on the two displays 19, 23. The store scales furthermore include a power pack 29 for the power supply of the store scales and a label printer and/or till receipt printer 27.

The aforesaid components are also used in conventional store scales.

The processor unit 13 is simultaneously designed as a speech recognition device, as a comparator and as a control device to compare words of a conversation detected by means of a microphone 11 between a customer and a salesperson with keywords stored on a hard disk 15 of the store scales to present product-related information available on a server 17 on the displays 19, 23, as will now be explained in more detail in the following.

A customer approaches a fresh product counter of a retail store or of a supermarket, for example a meat or sausage counter at which the store scales described above are installed, and tells the salesperson, for example, "I would like two veal chops, please". The microphone 11 of the store scales, which is configured to listen to the conversation between the customer and the salesperson, converts the words of the customer into an electrical speech signal and forwards it to the processor unit 13 which carries out speech recognition and consequently generates the text "I would like two veal chops, please".

Subsequently, the processor unit 13 compares this text with keywords which are stored on the hard disk 15 and which belong to a group of keywords which are product names such as "pork goulash", "neck of pork", "veal chop" or "frankfurters". This process is also called "keyword spotting". In the present case, the keyword "veal chop" is recognized in the generated text.

Figure 2:
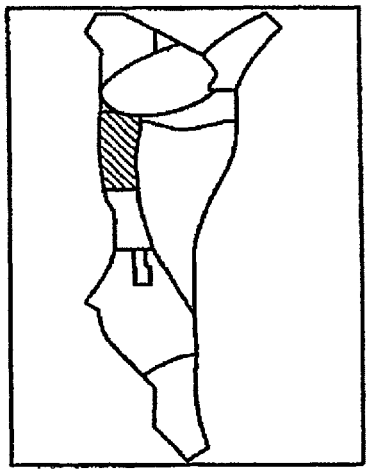
FIG. 2 illustrates a display of the store scales of FIG. 1.

After recognition of the keyword "veal chop", the processor unit 13, for example, shows a recipe for the preparation of a veal chop on the customer display 19, as can be recognized from FIG. 2. The recipe can be stored on the hard disk 15 or can be accessed from the server 17 which can be located, for example, in the retail store, in the supermarket, in a branch or in the headquarter of the branch connected via a remote data transmission network. In addition to a recipe, however, any other information stored on the hard disk 15 or the server 17 and associated with veal chops can also be displayed on the customer display 19, such as an indication of origin "cross-selling" offers, with a veal chop, for example, a classic red wine which is likewise available in the retail store or in the supermarket, or information on ingredients or components which could trigger allergic reactions.

Alternatively to this, the control of the customer display 19 can also be configured by the processor unit 13 such that, after recognition of the keyword, a piece of information associated with the product name is not directly displayed, but rather a selection of different topics, with the customer then being able to select the desired topic from a menu, for example via the customer display 19 which is preferably designed as a touch screen. The topic can, for example, inter alia be the types of information already listed above, i.e. indications of origin, "cross-selling" offers or allergy advice.

As can be recognized from FIG. 2, the non-selected topics can also be displayed simultaneously with the information of the selected topic and thus continue to remain selectable.

In particular to increase the robustness of the speech recognition, the processor unit 13 can be configured not already to display a piece of information associated with the recognized product on the sole recognition of the product name, but rather only in those cases in which the product name is stored together with at least one further keyword which is stored in a further group of keywords which are not product names, such as indications of number or amount such as "two", "hundred", "grams", "pieces" or "pair".

In the present case, the two keywords "two" and "veal chop" are recognized in the text, which combination is defined, for example, as a permitted combination so that a piece of information associated with a veal chop is displayed on the customer display 19. If, for example, the two keywords "frankfurters" and "grams" were recognized, which combination is defined as a non-permitted combination, for example, no display of the information on the customer display 19 would take place since then there would be a certain uncertainty whether the product name was recognized correctly.

The speech recognition takes place independently of the speaker. However, the store scales have been taught the voice or voices of the salesperson or persons so that the store scales can recognize whether the respectively generated text originates from a customer or from a salesperson.

Furthermore, the store scales are able to recognize the age and the gender of the customer. This is in particular of advantage because then a piece of information tailored to the respective customer can be presented on the customer display 19. For example, a male customer could be offered beer instead of a classic red wine to accompany a veal chop, or a youth could be offered some barbecue sauce.

To avoid a display of product-related information on the customer display 19 when a sales procedure is not taking place at all, for example when two customers talking to one another walk past the store scales, with a product name stored as a keyword being mentioned more randomly, the processor unit 13 is configured only to output the product-related information when the keyword, which is a product name or a combination of permitted keywords, is recognized within a preset time window of, for example, some seconds after an activation time.

The preset time window is preferably activated at a time at which a sales process starts, in particular for a further article, for example, when the sales person says the words, "Good morning, how can I help you?" or "Can I get you anything else?". These words are then converted into the text "Good morning, how can I help you?" or "Can I get you anything else?" and are compared with a third group of keywords, with the processor unit 13 being caused to activate the preset time window when a keyword belonging to the third group is detected in the generated text. This group of keywords can, for example, be the words "good", "morning", "help", "get", "anything" or "else".

However, the processor unit 13 can also be adapted such that the preset time window is only activated when a permitted combination of keywords is recognized, for example the combination of the words "good-morning-help" or the combination of words "get-anything-else", with additionally the order of the words also being able to be important in the respective permitted combination.

The information associated with a recognized product name can be displayed on the customer display 19 together with the weight information and price information of the product. However, a separate display can generally also be provided for the product-related information. Furthermore, it is also possible that the product-related information is only displayed to the salesperson who is, for example, advised of ingredients of the product triggering allergic reactions and can then inform and advise the customer accordingly. A customer display 19 and a salesperson display 23 are provided in FIG. 1. It is generally, however, also possible that a common display is present for the customer and for the salesperson.

The invention claimed is:

1. An apparatus for the processing of sales of articles of a product assortment to a customer, in particular store scales, comprising:
   a microphone device configured for listening to a conversation between a customer and a sales person for the conversion of connected spoken words of the conversation into an electrical speech signal;
   a speech recognition device for the generation of a speech recognition result representing the words from the electrical speech signal;
   a comparator for the comparison of the speech recognition result with keywords stored in a memory device of the apparatus for the keyword recognition in the speech recognition result, with at least some of the stored keywords being product names which define a group of keywords; and
   a control device which, on the detection, within a preset time window, of a keyword belonging to the group and/or of a permitted combination of keywords which includes a keyword belonging to the group, is configured to output a piece of information associated with the detected keyword or the detected permitted combination and available via a data source or to output an offer to output the information by means of an output device of the apparatus, wherein the preset time window is activated on the recognition of a keyword belonging to a corresponding group of keywords or on the recognition of a permitted combination belonging to a corresponding group of permitted combinations of keywords.

2. An apparatus in accordance with claim 1, wherein the permitted combination includes a keyword of a further group of keywords whose keywords are not a product name.

3. An apparatus in accordance with claim 1, wherein the speech recognition device is configured to differentiate between statements of the customer and statements of the salesperson.

4. An apparatus in accordance with claim 1, wherein the speech recognition device is configured to recognize the age and/or the gender of the customer.

5. An apparatus in accordance with claim 4, wherein the control device is configured to select the information or the offer to output the information in dependence on the age and/or gender of the customer.

6. An apparatus in accordance with claim 1, wherein the output device comprises a visual presentation device.

7. An apparatus in accordance with claim 6, wherein the output device comprises a touch screen.

8. An apparatus in accordance with claim 1, wherein the data source comprises a hard disk, a flash component and/or a server.

9. A method for the operation of an apparatus for the processing of sales of articles of a product assortment to a customer, in particular store scales, comprising:
   listening to a conversation between a customer and a salesperson and converting connected spoken words of the conversation into an electrical speech signal;
   generating a speech recognition result representing the words from the electrical speech signal;
   comparing the speech recognition result with stored keywords to recognize keywords in the speech recognition result, with at least some of the stored keywords being product names which define a group of keywords; and
   on the detection, within a preset time window, of a keyword belonging to the group and/or of a permitted combination of keywords, which includes a keyword belonging to the group, outputting a piece of information associated with the detected keyword or with the detected permitted combination or an offer to output the information, wherein the preset time window is activated on the recognition of a keyword belonging to a corresponding group of keywords or on the recognition of a permitted combination belonging to a corresponding group of permitted combinations of keywords.

10. A method in accordance with claim 9, wherein the permitted combination includes a keyword of a further group of keywords whose keywords are not a product name.

11. A method in accordance with claim 9, wherein a distinction is made between statements of the customer and statements of the salesperson by means of the speech recognition.

12. A method in accordance with claim 9, wherein the age/and or gender of the customer is recognized by means of the speech recognition.

13. A method in accordance with claim 12, wherein the information or the offer to output the information is selected in dependence on the age and/or gender of the customer.

14. A method in accordance with claim 9, wherein the output of the information or the offer to output the information is displayed visually.

15. A non-transitory computer readable data carrier, storing thereon a computer program product with program code means adapted to carry out, on a computer, a method for the operation of an apparatus for the processing of sales of articles of a product assortment to a customer, in particular store scales, wherein the method comprises:
   listening to a conversation between a customer and a salesperson and converting connected spoken words of the conversation into an electrical speech signal;
   generating a speech recognition result representing the words from the electrical speech signal;
   comparing the speech recognition result with stored keywords to recognize keywords in the speech recognition result, with at least some of the stored keywords being product names which define a group of keywords; and
   on the detection, within a preset time window, of a keyword belonging to the group and/or of a permitted combination of keywords, which includes a keyword belonging to the group, outputting a piece of information associated with the detected keyword or with the detected permitted combination or an offer to output the information, wherein the preset time window is activated on the recognition of a keyword belonging to a corresponding group of keywords or on the recognition of a permitted combination belonging to a corresponding group of permitted combinations of keywords.

* * * * *